(12) United States Patent
Khatib et al.

(10) Patent No.: US 10,996,909 B2
(45) Date of Patent: May 4, 2021

(54) DOCUMENT PROCESSING FOR PRINTING

(71) Applicant: Hewlett-Packard Development Company, L.P., Spring, TX (US)

(72) Inventors: Imtiyaz Altafhussain Khatib, Singapore (SG); Jose Mattathilanickal Chacko, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/483,269

(22) PCT Filed: Feb. 24, 2017

(86) PCT No.: PCT/US2017/019271
§ 371 (c)(1),
(2) Date: Aug. 2, 2019

(87) PCT Pub. No.: WO2018/156140
PCT Pub. Date: Aug. 30, 2018

(65) Prior Publication Data
US 2020/0004482 A1 Jan. 2, 2020

(51) Int. Cl.
*G06F 3/12* (2006.01)
(52) U.S. Cl.
CPC .......... *G06F 3/1256* (2013.01); *G06F 3/1205* (2013.01); *G06F 3/1208* (2013.01)
(58) Field of Classification Search
None
See application file for complete search history.

(56) References Cited

U.S. PATENT DOCUMENTS

| | | | |
|---|---|---|---|
| 6,104,470 A * | 8/2000 | Streefkerk | G06F 3/0483 355/40 |
| 6,268,924 B1 | 7/2001 | Koppolu et al. | |
| 7,088,462 B2 * | 8/2006 | Bhogal | G06F 3/1204 358/1.15 |
| 7,559,024 B2 | 7/2009 | Mori et al. | |
| 8,826,126 B1 | 9/2014 | Toscano et al. | |
| 9,076,085 B2 | 7/2015 | Yamada | |
| 9,609,153 B2 * | 3/2017 | Haginoya | H04N 1/0044 |
| 2002/0046238 A1 | 4/2002 | Estavillo et al. | |

(Continued)

FOREIGN PATENT DOCUMENTS

JP 2017/027623 A 2/2017

OTHER PUBLICATIONS

IT Help ~ University of Leicester ~ Webpage ~ Staple as you print, copy or scan ~ Oct. 14, 2016 ~ 2 pages.

*Primary Examiner* — Dung D Tran
(74) *Attorney, Agent, or Firm* — HP Inc. Patent Department

(57) ABSTRACT

The present subject matter discloses processing documents for printing. In an example implementation, a print preview of a plurality of documents to be printed by an image forming system is generated. The plurality of documents is assigning to at least one print job bucket. Each print job bucket is indicative of a print job for documents assigned to a respective print job bucket. A set of print job attributes is assigned to each print job bucket. The set of print job attributes is indicative of print settings for printing documents associated with a respective print job bucket.

12 Claims, 8 Drawing Sheets

(56) References Cited

U.S. PATENT DOCUMENTS

| | | | |
|---|---|---|---|
| 2002/0124027 A1* | 9/2002 | Krueger | H04N 1/603 |
| | | | 715/275 |
| 2004/0156064 A1* | 8/2004 | Owen | G06F 3/1204 |
| | | | 358/1.13 |
| 2006/0033956 A1* | 2/2006 | Takahashi | G06K 15/00 |
| | | | 358/1.15 |
| 2007/0005561 A1* | 1/2007 | Sakura | G06F 3/1205 |
| 2007/0146784 A1* | 6/2007 | Perry | G06Q 10/10 |
| | | | 358/1.16 |
| 2007/0253020 A1 | 11/2007 | Hull et al. | |
| 2007/0268519 A1* | 11/2007 | Appercel | G06F 3/1205 |
| | | | 358/1.15 |
| 2011/0157636 A1 | 6/2011 | Maeda | |

\* cited by examiner

DOCUMENT PROCESSING FOR PRINTING

BACKGROUND

Image forming systems, such as ink-jet printers, photocopiers, laser printers, and multi-function printers may have scanning and printing capabilities. Some documents, such as photographs, pages of books, certificates, identification cards, or the like, may be scanned and then printed in order to reproduce them. Documents to be scanned and printed may be of different sizes, may have varying margin requirements, and may include different contents.

BRIEF DESCRIPTION OF DRAWINGS

The following detailed description references the drawings, wherein.

DETAILED DESCRIPTION

Figure 1:
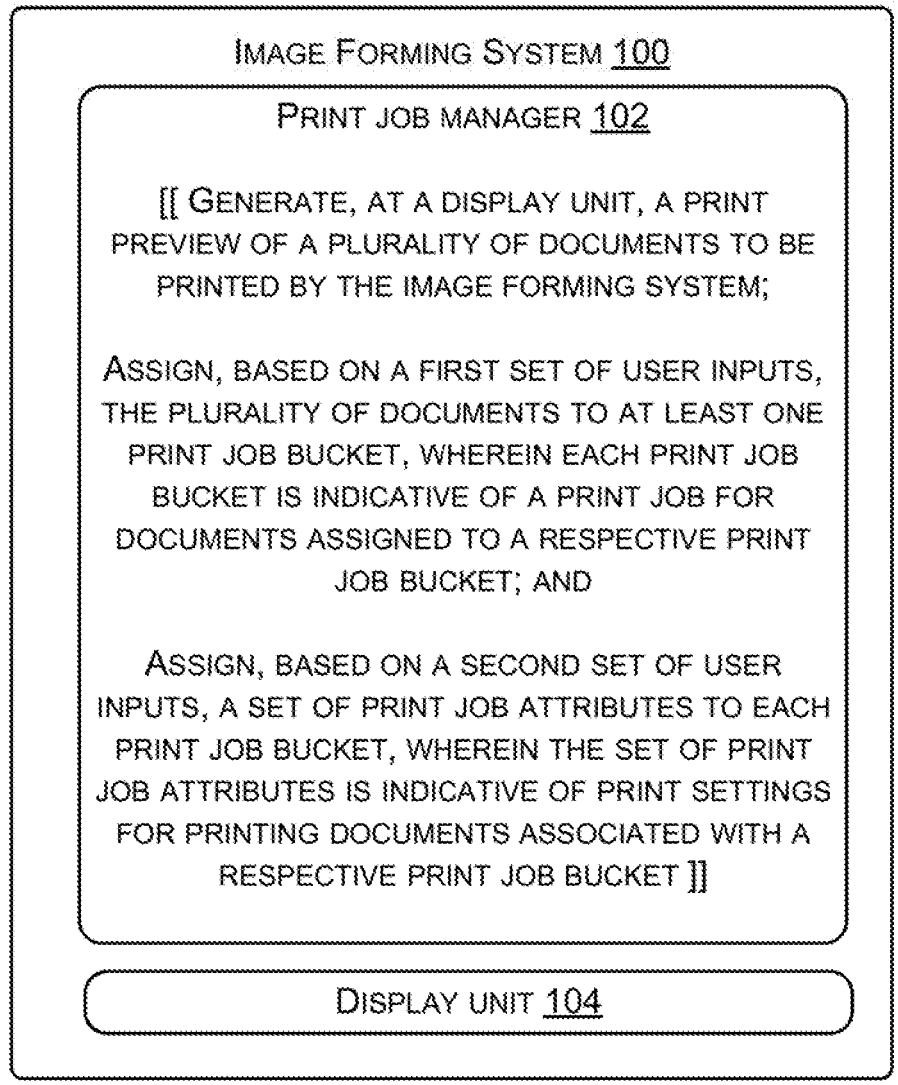
FIG. 1 illustrates an image forming system having a print job manager, according to an example implementation of the present subject matter.

Reproduction of documents using an image forming system may involve scanning of documents and printing the scanned documents based on different print settings. Print settings may refer to features, such as text margins, font type/style, text alignment, text orientation, paper size, single/both sided printing, page orientation, or the like, for printing of the documents.

In an example, person A may have pages of books to be reproduced and person B may have photographs to be reproduced. For reproduction of these two different types of documents, the documents are scanned before being printed. The print settings associated with printing of the scanned pages of books of person A may be different from print settings associated with printing of the scanned photographs of person B.

Image forming systems generally process scanning and printing of such different types of documents with varying print settings, separately and serially. In a first scenario, the pages of books to be reproduced for person A may be scanned, print settings for printing the pages of books may be specified, and the pages of books may be printed based on their associated print settings. Subsequently, photographs of person B may be scanned, the print settings for printing the photographs may be specified, and the photographs may be printed based on their associated print settings. In a second scenario, both, the pages of books and the photographs may be scanned first. Then, print settings for the pages of books may be specified and the pages of books may be printed. After printing of the pages of books, print settings for the photographs may be specified and the photographs may be printed.

In scanning and printing of a large number of different documents belonging to different persons and associated with different print settings, as described above, the overall time for scanning and printing of all the documents may be high. Also, since print setting may have to be specified for each document before printing, the complexity and the manual effort involved in document handling by a user of the image forming system may be large.

The present subject matter describes processing documents for printing. The present subject matter enables scanning together multiple documents associated with different print settings and segregating/grouping the scanned documents for being printed collectively with a respective print setting applied to each group of the documents. With the systems and the methods of the present subject matter, the overall time for scanning and printing all the documents associated with different print settings is reduced. Also, the methods and the systems of the present subject reduce manual effort of the user, otherwise consumed in serially scanning and printing the documents.

In an example implementation, a print preview of scanned documents which are to be printed is generated on a display panel of the system, also referred to as an image forming system. On generating the print preview, the documents to be printed are assigned to one or more print job buckets based on user inputs. User inputs may, for example, be gesture based touch inputs on the display panel of the system. Each print job bucket is a collection of documents and is indicative of a print job for those documents. A set of print job attributes is assigned to each of the print job buckets. The set of print job attributes is indicative of print settings for printing of documents associated with a respective print job bucket. After the print job attributes are assigned to the print job buckets, documents in respective print job buckets are printed based on the assigned print job attributes. Further, in an example implementation, print finish attributes may also be assigned to each print job bucket. The system may implement finishing operations, such as folding, stapling, and hole punching, on the printed documents based on print finish operations associated with a respective print job bucket.

Thus, the present subject matter enables scanning and printing of documents with different print settings collectively, by grouping the different documents in different print job buckets and by assigning print job attributes to each print job bucket. This may help to reduce complexity in document handling, reduce manual effort of the user, and provide an enriched user experience. Further, with the methods and systems of the present subject matter, as print finish attributes can also be assigned to each print job bucket, documents associated with a respective print job bucket on being printed, can be separately bundled based on the print finish attributes. This enhances user convenience during handling of multiple copies of documents.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates an image forming system 100 having a print job manager 102, according to an example implementation of the present subject matter. The image forming system 100, also referred to as the system 100, may be a printing system having scanning and printing capabilities. Examples of the image forming system 100 include an inkjet scanner printer, a laser scanner printer, a photocopier, a multi-function printer, or the like.

In an example implementation, the print job manager 102 may be implemented as hardware, such as a processor(s) or through logical instructions or a combination thereof. In an example implementation, the processor(s) may be external to the print job manager 102 and may be coupled to the print job manager 102. The processor(s) may be implemented as microprocessors, microcomputers, microcontrollers, digital signal processors, central processing units, state machines, logic circuitries, and/or any devices that manipulate signals based on operational instructions. Among other capabilities, the processor(s) may fetch and execute computer-readable instructions stored in a memory coupled to the processor(s). The memory can be internal or external to the image forming system 100. The memory may include any non-transitory computer-readable storage medium including, for example, volatile memory (e.g., RAM), and/or non-volatile memory (e.g., EPROM, flash memory, NVRAM, memristor, etc.). The functions of the various elements shown in FIG. 1, including any functional blocks labeled as "processor(s)", may be provided through the use of dedicated hardware as well as hardware capable of executing computer-readable instructions.

The print job manager 102 amongst other things, include routines, programs, objects, components, data structures, and the like, which perform particular tasks or implement particular abstract data types. The print job manager 102 may be coupled to, and executed by, the processor(s) to perform various functions for processing of documents to be printed by the image forming system 100, in accordance with an example implementation of the present subject matter.

The system 100 further includes a display unit 104. Examples of the display unit 104 may include, but are not limited to, a liquid crystal display (LCD) panel. In another example, the display panel 104 maybe touch-enabled. In an example implementation, the display unit 104 may be integrated within a control panel of the system 100. The display unit 104 is operable to render a print preview of a plurality of documents to be printed by the system 100. In an example implementation, the print preview may be displayed in a user interface rendered on the display unit 104. The print job manager 102 may be in communication with the display unit 104 for performing several functions for the purpose of generating previews and receiving user inputs.

In an example implementation, when a scan of a plurality of documents are performed in the system 100, a print preview of all the scanned documents for being printed may be generated at the display unit 104. Upon generating the print preview, the print job manager 102 may receive a first set of user inputs based on which the print job manager 102 assigns the plurality of documents to at least one print job bucket.

In an example implementation, the first set of user inputs may be touch and gesture based touch inputs on the display unit 104. In an example implementation, some of the documents from the plurality of documents may be assigned to one print job bucket and few of the others or remaining may be assigned to another print job bucket. Each print job bucket is a collection of documents and is indicative of a print job for those documents assigned to a respective print job bucket. A print job may be defined as a single unit of work to be executed by the system 100 and may include printing of one document or a plurality of documents. The system 100 may assign a specific print job number to each print job. The print job may be represented as a file or data resource in a print queue of the system 100, where the file includes printer control instructions for printing the documents associated with the print job.

The print job manager 102 may also assign, based on a second set of user inputs, a set of print job attributes to each print job bucket. The set of print job attributes is indicative of print settings for printing of documents associated with a respective print job bucket. The print settings refer to settings of the imaging system 100 and print media options for printing the documents. In an example implementation, the set of print job attributes may include text margins, font type/style, text alignment, text orientation, paper size, single/both sided printing, page orientation, number of copies, or the like. In an example implementation, the print job manager 102 may receive the second set of inputs specifying a selection of the set of print job attributes for each print job bucket. In an example implementation, the second set of user inputs may be touch inputs and gesture based touch inputs on the display panel 104.

Once the set of print job attributes are assigned to each print job bucket, all the scanned documents segregated in different print job buckets may be printed based on the set of print job attributes of respective print job buckets.

Thus, as explained above, the present subject matter enables scanning and printing of documents with different print job attributes simultaneously by grouping the different documents in different print job buckets and by assigning print job attributes to each print job bucket. This reduces the processing time for scanning and printing different documents and enhances user convenience in document copying and handling.

An example procedure of processing of documents for scanning and printing is described hereinafter with reference to FIGS. 2A to 2F.

Figure 2A:
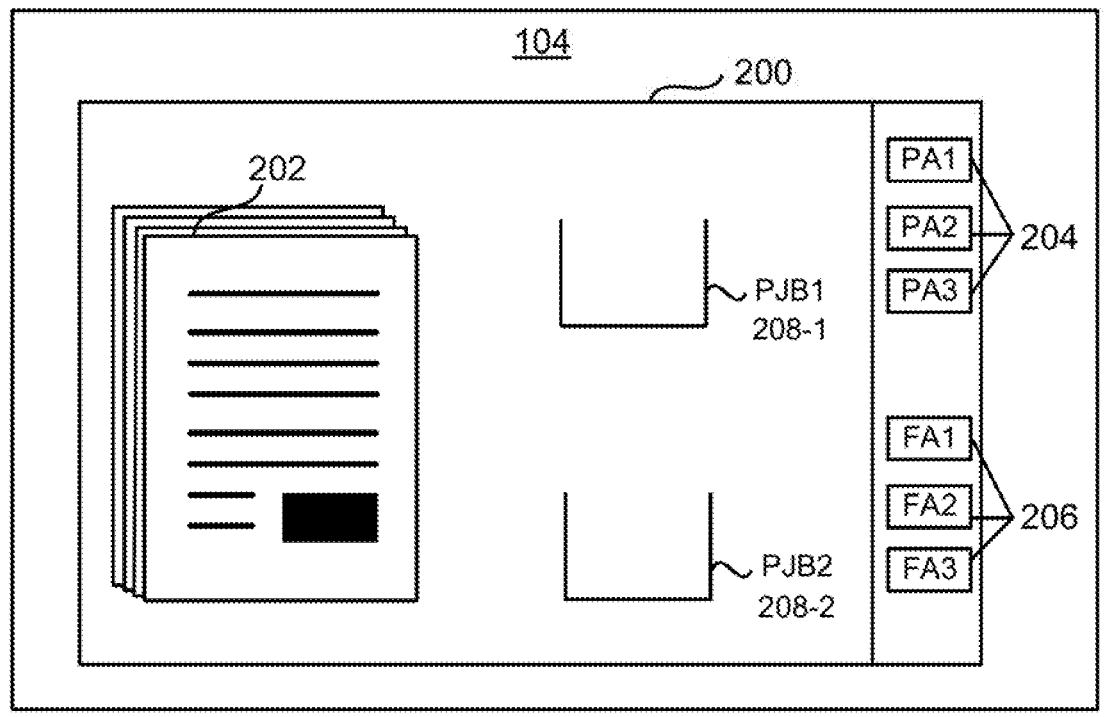
FIG. 2A illustrates a graphical user interface displayed on a display unit of the image forming system, according to an example implementation of the present subject matter.

FIG. 2A illustrates a graphical user interface (GUI) 200 displayed on the display unit 104 of the image forming system 100. When a plurality of documents are scanned at the system 100 for being printed, the print job manager 102 generates a print preview 202 of the plurality of documents in the GUI 200. Each document from the plurality of documents is represented as a single scanned page in the print preview 202. In the generated print preview 202, the scanned documents may be displayed as multiple pages overlapped on one another, as illustrated in FIG. 2A, or may be displayed as visual representations of non-overlapping pages.

As illustrated in FIG. 2A, a first set of representative icons 204 is displayed in the GUI 200 which is indicative of various print job attributes. Although, in FIG. 2A, three print job attributes PA1, PA2, and PA3 are shown, there may be more than three print job attributes provided in the GUI 200. Each of the print job attributes, PA1, PA2, and PA3 may be indicative of a print setting of the system 100. For example, a first print job attribute PA1 may be indicative of print settings for portrait text orientation, a second print job attribute PA2 may be indicative of print settings for landscape text orientation, and a third print job attribute PA3 may be indicative of print settings for printing two pages on one side of a sheet. In an example implementation, one print job attribute or multiple print job attributes may be associated with a document. In an example implementation, other print job attributes indicative of print settings, such as text margins, font type/style, text alignment, paper size, single/both sided printing, page orientation, or the like, may be displayed on the display unit 104.

Further, as illustrated in FIG. 2A, a second set of representative icons 206 is displayed in the GUI 200 which is indicative of various print finish attributes. Although in FIG. 2A three print finish attributes, FA1, FA2, and FA3 are shown, there may be more than three print finish attributes provided in the GUI 200. Each of the print finish attributes, FA1, FA2, and FA3 may be associated with finishing settings of the system 100. For example, a first print finish attribute FA1 may be indicative of finishing settings for stapling on the top left corner of a page, a second print finish attribute FA2 may be indicative of finishing settings for hole punching, and a third print finish attribute FA3 may be indicative of finishing settings for folding. In an example implementation, one print finish attribute or multiple print finish attributes may be associated with the documents. In an example implementation, other print finish attributes indicative of finishing operations, such as binding, booklet creation, or the like may be displayed on the display unit 104.

Further, print job buckets 208 are provided on the GUI 200. FIG. 2A shows a first print job bucket PJB1, referenced as 208-1, and a second print job bucket PJB2, referenced as 208-2. Although FIG. 2 shows two print job buckets, there can be more than two print job buckets. Each print job bucket is depicted as a symbolic representative icon rendered in the GUI 200. Each print job bucket is a collection of documents and is indicative of a print job for those documents.

Figure 2B:
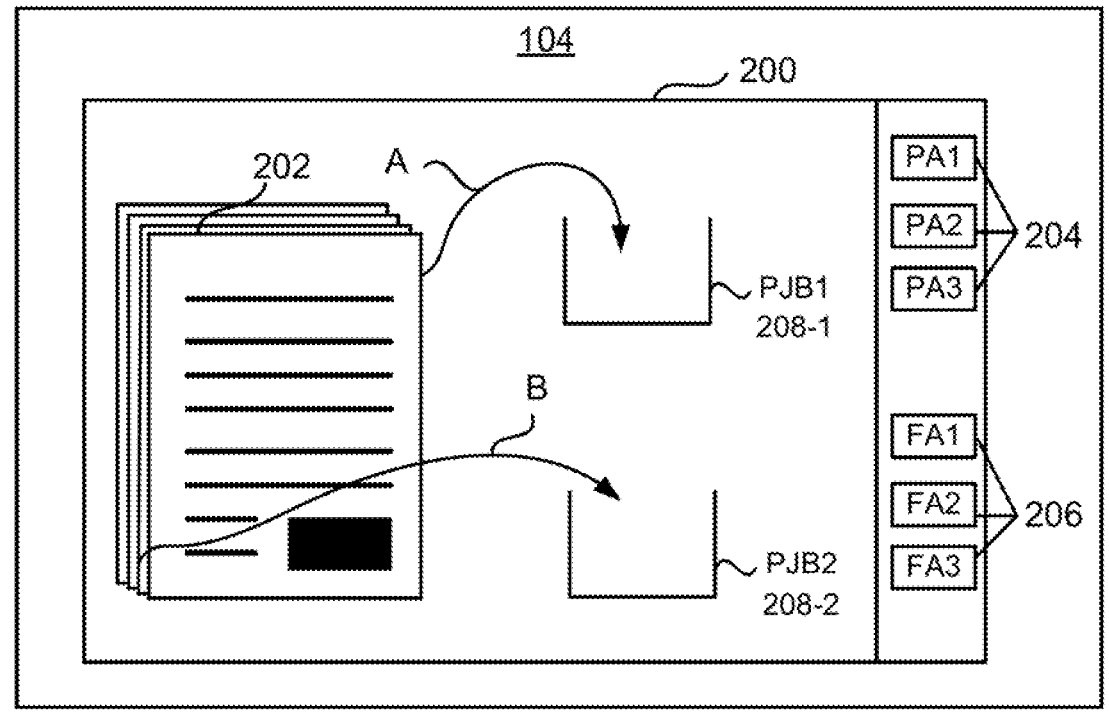
FIG. 2B illustrates the graphical user interface depicting assignment of documents to print job buckets, according to an example implementation of the present subject matter.

FIG. 2B illustrates a graphical user interface depicting assignment of the previewed documents to print job buckets 208-1 and 208-2. In an example implementation, to assign the plurality of documents to at least one print job bucket, the print job manager 102 receives a first set of user inputs. The first set of user inputs may be gesture based touch inputs on the display unit 104, indicative of assignment of the plurality of documents to the at least one print job bucket. A user, through gesture based touch inputs on the display unit 104, may drag, as indicated by arrow A, a document from the print preview 202 of documents and drop the document in the first print job bucket PJB1 to assign the document to the first print job bucket PJB1. Similarly, the user, may drag, as indicated by arrow B, another document from the print preview 202 of the documents and drop the other document in the second print job bucket PJB2 to assign the other document to the second print job bucket PJB2. In response to receiving the drag and drop gestures, as indicated by arrows A and B, the print job manager 102 assigns the documents respectively to the print job buckets PJB1 and PJB2.

Figure 2C:
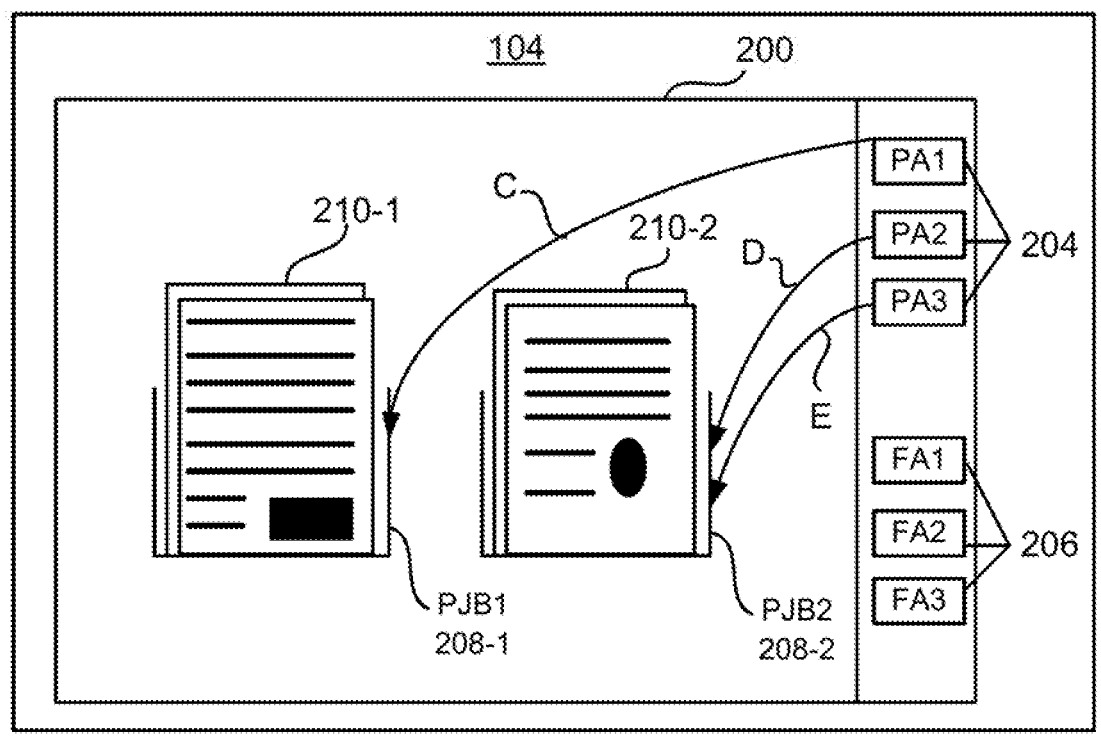
FIG. 2C illustrates the graphical user interface depicting assignment of print job attributes to respective print job buckets, according to an example implementation of the present subject matter.

Documents assigned to the first print job bucket PJB1 are referred to as a first set of documents and documents assigned to the second print job bucket PJB2 are referred to as a second set of documents. In FIG. 2C, the first set of documents associated with the first print job bucket PJB1 is referenced as 210-1 and the second set of documents associated with the second print job bucket PJB2 is referenced as 210-2. Thus, the scanned documents are being segregated/grouped into two sets, viz., the first set of documents 210-1 and the second set of documents 210-2. Although, in FIGS. 2B and 2C scanned documents are shown to be assigned to two print job buckets, in an example implementation, the scanned documents may be assigned to more than two print job buckets.

Once the documents are assigned to respective print job buckets, the print job manager 102 can assign, based on a second set of user inputs, a set of print job attributes to each print job bucket. The set of print job attributes may include a single print job attribute, such as any of the print job attributes PA1 to PA3, or multiple print job attributes, such as a combination of any of the print job attributes PA1 to PA3. In an example implementation, to assign the set of print job attributes to each print job bucket, the print job manager 102 receives the second set of user inputs. The second set of user inputs may be gesture based touch inputs on the display unit 104, indicative of assignment of the set of print job attributes to each print job bucket.

With reference to FIG. 2C, a user, through gesture based touch inputs on the display unit 104, may drag, as indicated by arrow C, the first print job attribute PA1 and drop the first print job attribute PA1 on the first print job bucket PJB1 for assignment of the first print job attribute PA1 to the first print job bucket PJB1. Likewise, the user can drag and drop, as indicated by arrows C and D, the second print job attribute PA2 and the third print job attribute PA3 on the second print job bucket PJB2 for assignment of the second and third print job attributes to the second print job bucket PJB2.

In response to receiving the drag and drop gestures, indicated by arrows C, D, and E, the print job manager 102 assigns the print job attributes to respective print job buckets.

Figure 2D:
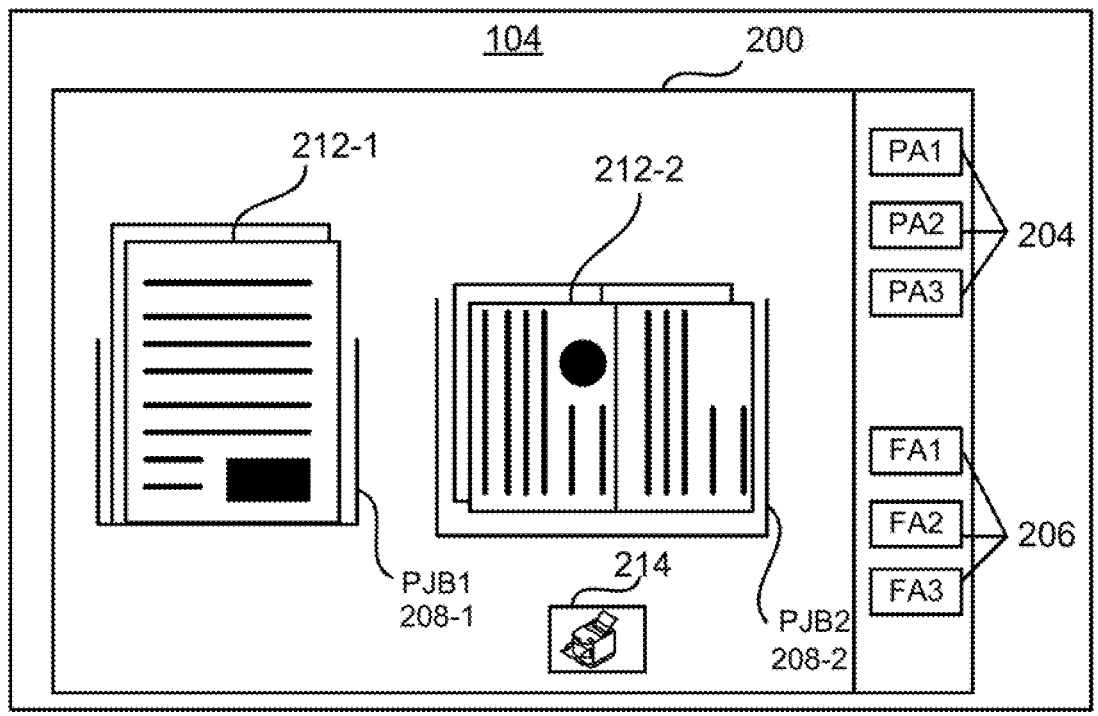
FIG. 2D illustrates the graphical user interface depicting print job bucket previews of the print job buckets, on the print job attributes being assigned to respective print job buckets, according to an example implementation of the present subject matter.

Upon assigning the print job attributes to the respective print job buckets, the print job manager 102 generates a print job bucket preview of each print job bucket. The print job bucket preview includes a visual representation of the set of print job attributes assigned to each print job bucket. FIG. 2D illustrates a first print job bucket preview 212-1 of the first print job bucket PJB1 once the first print job attribute PA1 is being assigned to the first print job bucket PJB1 and illustrates a second print job bucket preview 212-1 of the second print job bucket PJB2 once the second print job attribute PA2 is being assigned to the second print job bucket PJB1.

Consider that, as mentioned earlier, the print job attribute PA1 is indicative of print settings for portrait text orientation. Thus, the first print job bucket preview 212-1 visually represents the portrait text orientation in the documents associated with the first print job bucket PJB1. Likewise, consider that, as mentioned earlier, the second print job attribute PA2 is indicative of print settings for landscape text orientation and the third print job attribute PA3 is indicative of print settings for printing two pages on a single side of a sheet. Thus, the second print job bucket preview 212-1 visually represents the landscape text orientation and previews two pages to be printed on a single side of the sheet for the documents associated with the second print job bucket PJB2.

In an example implementation, along with the generation of the print job bucket previews, the print job manager 102 may also render a print icon 214 on the GUI 200, as shown in FIG. 2D. In an example implementation, the print job manager 102 may receive a print command corresponding to a touch based user input on the print icon 214. On receipt of the print command, the print job manager 102 may generate control instructions for printing, based on the assigned set of print job attributes, the documents associated with the respective print job buckets. In an example implementation, the print job manager 102 may be coupled to a printing unit (not shown) of the image forming system 100. The printing unit (not shown) on receiving the control instructions prints, based on the assigned set of print job attributes, the documents associated with the respective print job buckets. With reference to FIG. 2D, documents associated with the first print job bucket PJB1 are printed based on first print job attribute PA1 and documents associated with the second print job bucket PJB2 are printed based on the second and third print job attributes, PA2 and PA3.

Figure 2E:
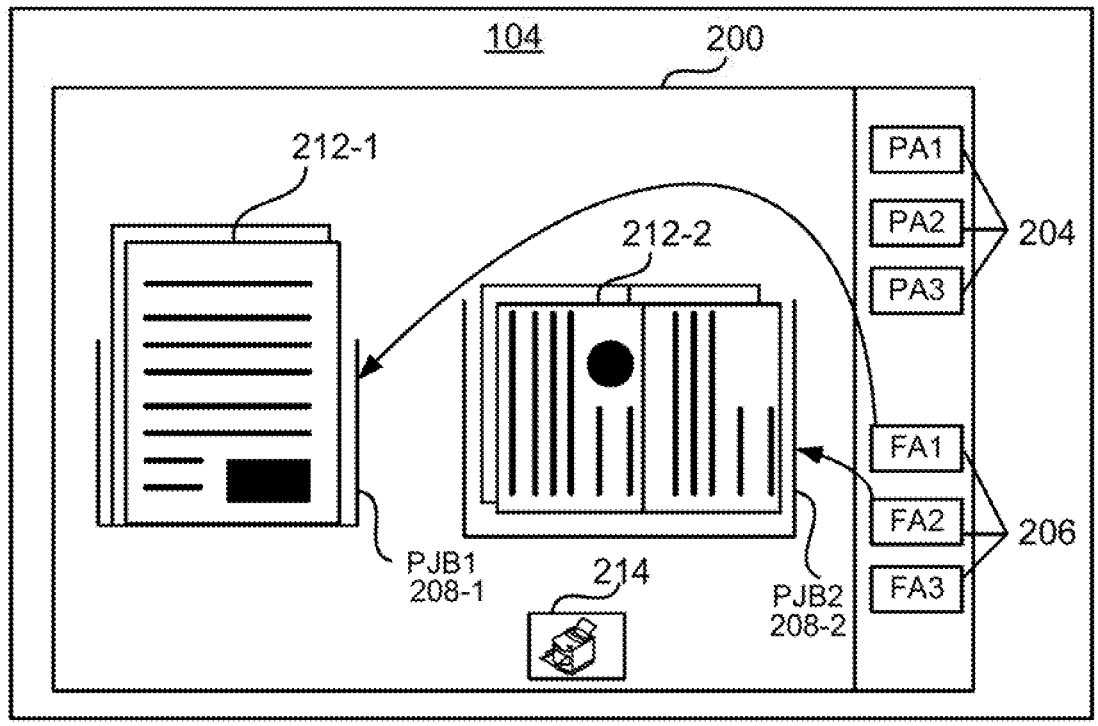
FIG. 2E illustrates the graphical user interface depicting assignment of print finish attributes to respective print job buckets, according to an example implementation of the present subject matter.

In an example implementation, after the print job previews are generated, the print job manager 102 may assign a set of print finish attributes to each print job bucket. As shown in FIG. 2E, a first print finish attribute FA1 is assigned to the first print job bucket PJB1 and a second print finish attribute FA2 is assigned to the second print job bucket PJB2. The first print finish attribute FA1 is indicative of finishing settings for implementing finishing operations on the documents associated with the first print job bucket PJB1 and the second print finish attribute FA2 is indicative of finishing settings for implementing finishing operations on the documents associated with the second print job bucket PJB2. The print finish attributes may be assigned to the respective print job buckets based on gesture based touch inputs. In an example implementation, the print job manager 102 may assign the print finish attributes based on gesture based touch inputs in a technique similar to the assignment of the print job attributes, as explained earlier.

Figure 2F:
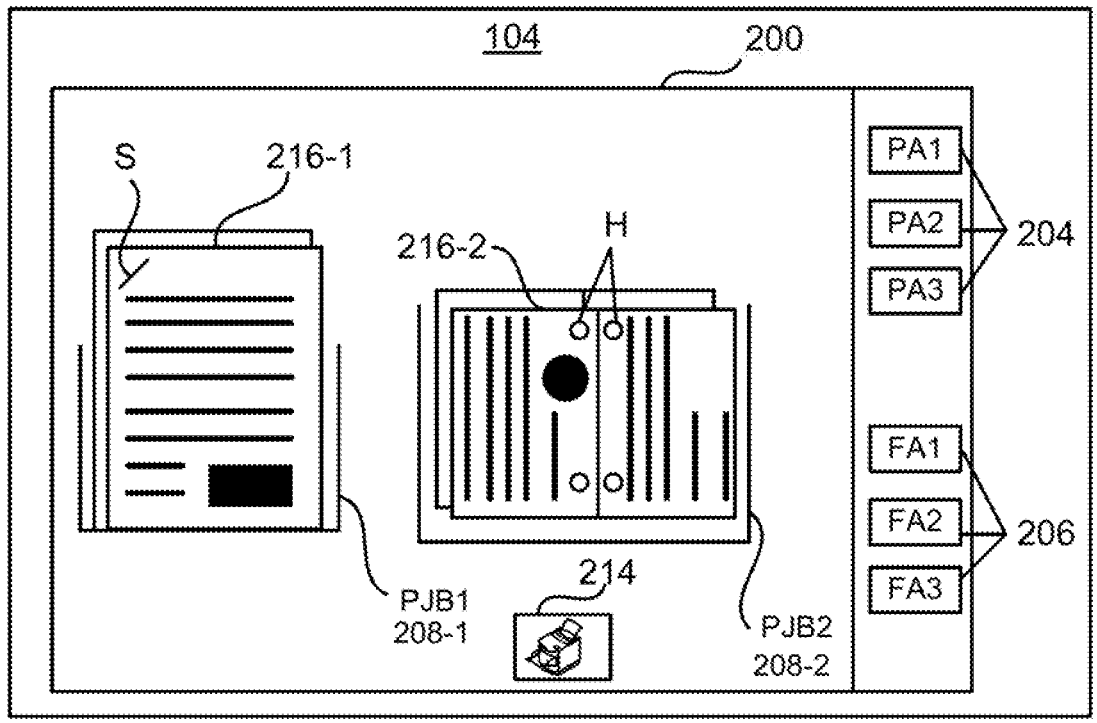
FIG. 2F illustrates the graphical user interface depicting finish job bucket previews of the print job buckets, on the print finish attributes being assigned to respective print job buckets, according to an example implementation of the present subject matter.

Upon assigning the print finish attributes to the respective print job buckets, the print job manager 102 generates a finish job bucket preview of each print job bucket. The finish job bucket preview includes a visual representation of the set of print finish attributes assigned to each print job bucket. FIG. 2F illustrates a first finish job bucket preview 216-1 of the first print job bucket PJB1 once the first print finish attribute FA1 is being assigned to the first print job bucket PJB1 and illustrates a second finish job bucket preview 216-2 of the second print job bucket PJB2 once the second print finish attribute FA2 is being assigned to the second print job bucket PJB2.

Consider that, as mentioned earlier, the first print finish attribute FA1 is indicative of finishing settings for implementing stapling operation on the top left corner of the printed documents associated with the first print job bucket PJB1. Thus, the first finish job bucket preview 216-1 visually represents the stapling operation being performed on the documents associated with the first print job bucket PJB1.

As shown in FIG. 2F, a staple mark referenced as S in the first finish job bucket preview 216-1 corresponds to the visual representation of the stapling operation. Likewise, consider that, as mentioned earlier, the second print finish attribute FA2 is indicative of finishing settings for implementing hole-punching operation on the printed documents associated with the second print job bucket PJB2. Thus, the second finish job bucket preview 216-2 visually represents the hole-punching operation being performed on the documents associated with the second print job bucket PJB2. As shown in FIG. 2F, the hole-punch marks referenced as H in the second finish job bucket preview 216-1 corresponds to the visual representation of the hole-punching operation.

Upon generating the finish job bucket previews, the print job manager 102 may receive a print command corresponding to a touch based user input on the print icon 214. On receipt of the print command, the print job manager 102 may generate control instructions for printing and implementing finishing operations on the documents in the respective print job buckets. The documents may be printed by the printing unit (not shown) and the finishing operations may be implemented by a finishing unit (not shown) of the image forming system, such as the image forming system 100. The printing unit and the finishing unit may be coupled to the print job manager 102.

On receiving the control instructions, the printing unit prints, based on the first print job attribute PA1, the documents associated with the first print job bucket PJB1 and prints, based on the first and second print job attributes PA2 and PA3, the documents associated with the second print job bucket PJB2. The finishing unit implements the stapling operation, based on the first print finish attribute FA1, on the printed documents associated with the first print job bucket PJB1 and implements the hole-punching operation, based on the second print finish attribute FA2, on the printed documents associated with the second print job bucket PJB2. Finally, after printing and implementation of the finishing operations, based on print job attributes and print finish attributes of respective print job buckets, the documents are discharged from the image forming system.

Figure 3:
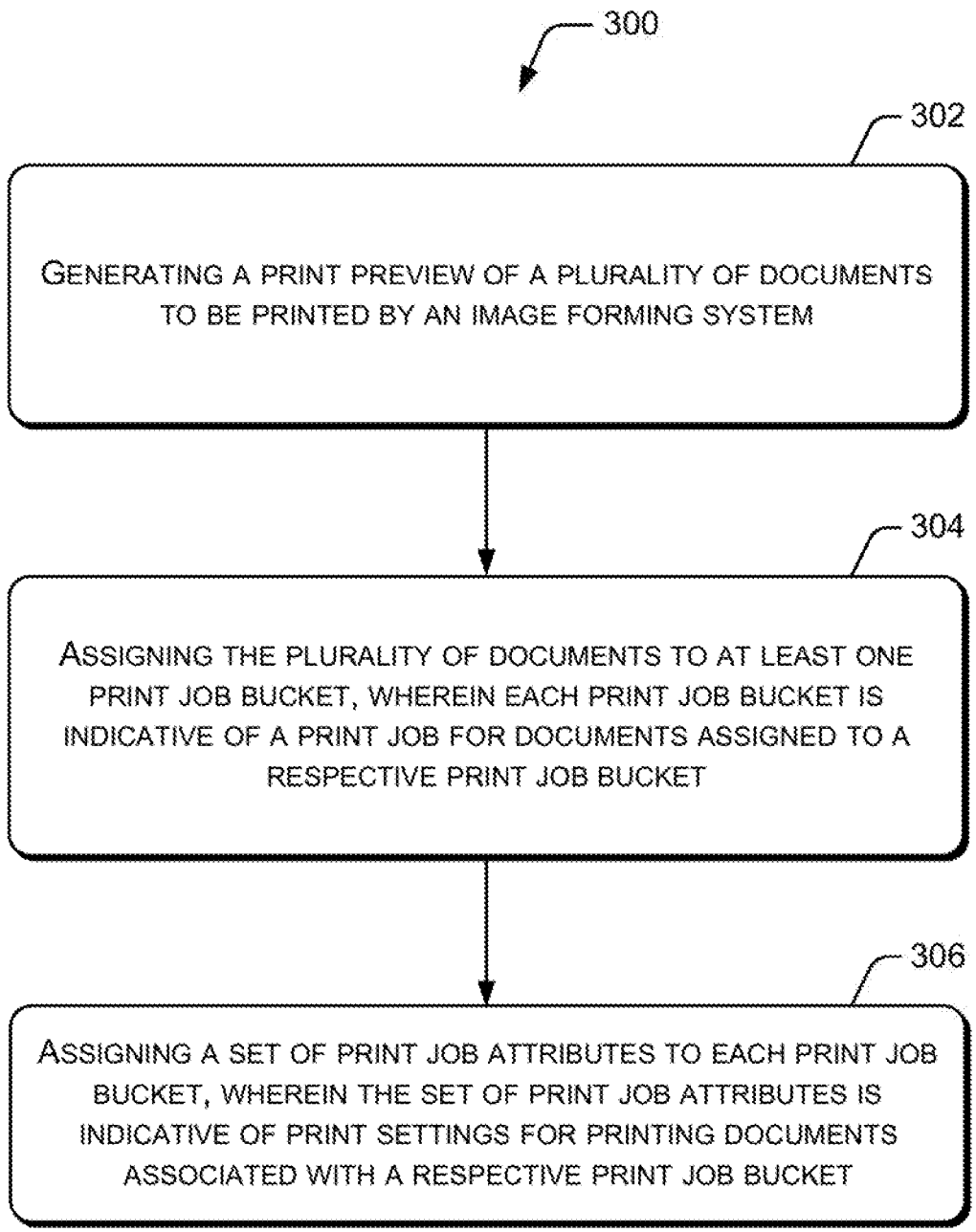
FIG. 3 illustrates a method of processing documents for printing, according to an example implementation of the present subject matter.

FIG. 3 illustrates a method of processing documents for printing, according to an example implementation of the present subject matter. The method 300 can be implemented by processor(s) or computing device(s) through any suitable hardware, a non-transitory machine readable medium, or combination thereof. In an example implementation, the steps of the method 300 as illustrated through blocks 302 to 306 may be performed by a print job manager, such as the print job manager 102, of an image forming system, such as the image forming system 100. Further, although the method 300 is described in context of the aforementioned image forming system 100, other suitable systems may be used for execution of the method 300. It may be understood that processes involved in the method 300 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

Referring to FIG. 3, at block 302, a print preview of a plurality of documents to be printed by an image forming system is generated. In an example implementation, the plurality of documents may be scanned and then the print preview of such documents may be displayed in a display unit of the image forming system.

At block 304, the plurality of documents is assigned to at least one print job bucket. Each print job bucket is indicative of a print job for documents assigned to a respective print job bucket. Assignment of the plurality of documents to the at least one print job bucket is based on receiving a first set of user inputs, such as gesture based touch inputs on a display unit of the image forming system.

At block 306, a set of print job attributes are assigned to each print job bucket. The set of print job attributes is indicative of print settings for printing of documents associated with a respective print job bucket. Assignment of the set of print job attributes to each print job bucket is based on receiving a second set of user inputs, such as gesture based touch inputs on a display unit of the image forming system.

Figure 4:
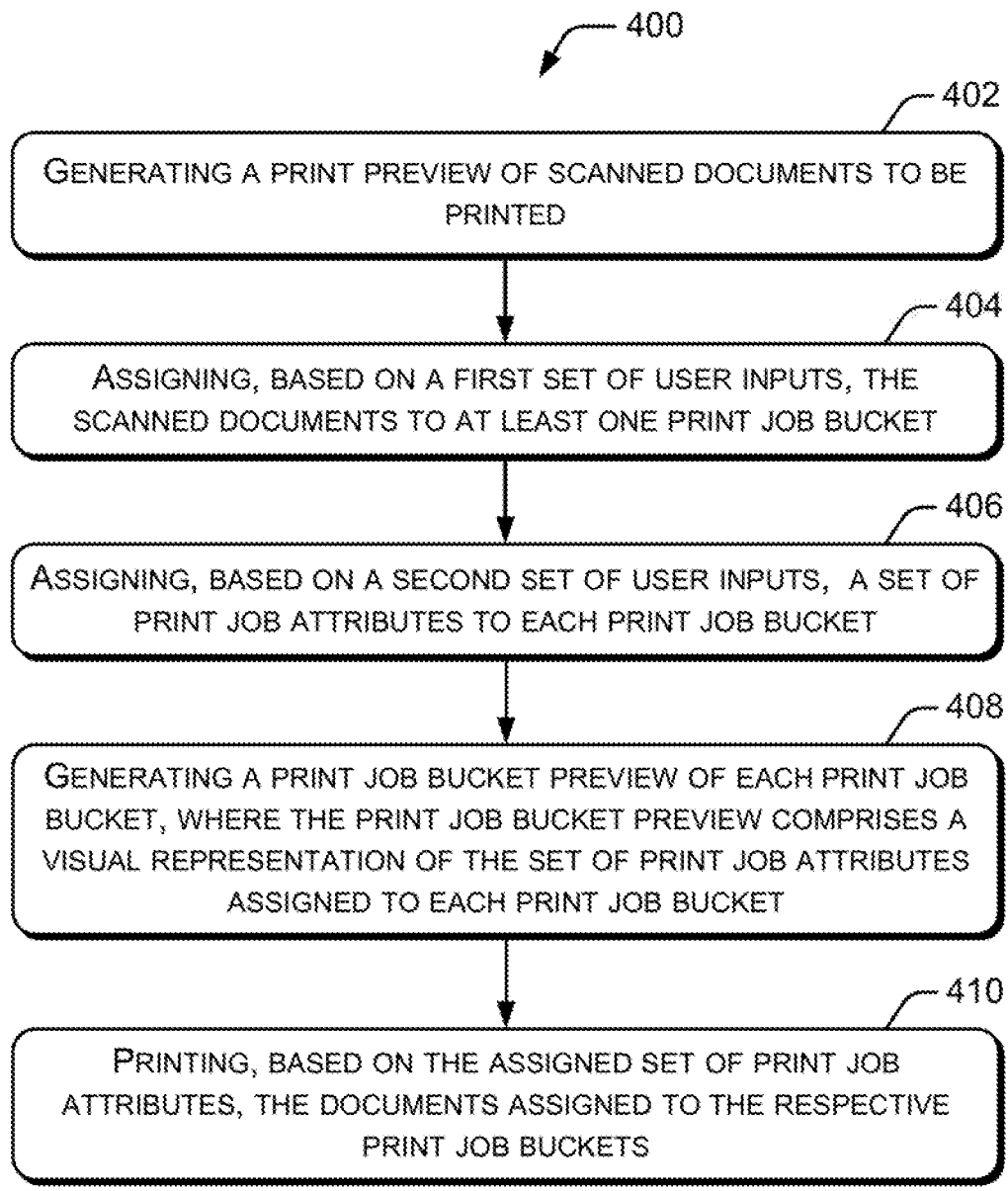
FIG. 4 illustrates a method of scanning and printing documents assigned to respective print job buckets, according to another example implementation of the present subject matter.

FIG. 4 illustrates a method 400 of scanning and printing documents assigned to respective print job buckets, according to another example implementation of the present subject matter.

When a plurality of documents is scanned at an image forming system, such as the image forming system 100, at block 402, a print preview of the scanned documents to be printed are generated. In an example implementation, a print job manager, such as the print job manager 102 may generate the print preview.

At block 404, the scanned documents are assigned, based on a first set of user inputs, to at least one print job bucket. In an example implementation, assigning the documents to the at least one print job bucket includes receiving the first set of user inputs indicative of assignment of the plurality of documents to the at least one print job bucket.

At block 406, a set of print job attributes are assigned, based on a second set of user inputs, to each print job bucket. In an example implementation, assigning the set of print job attributes to each print job bucket includes receiving the second set of user inputs indicative of assignment of the set of print job attributes to each print job bucket.

Once the set of print job attributes are being assigned to each print job bucket, at block 408, a print job bucket preview of each print job bucket is generated. The print job bucket preview comprises a visual representation of the set of print job attributes assigned to each print job bucket.

At block 410, the documents assigned to the respective print job buckets are printing based on the assigned set of print job attributes. In an example implementation, the documents may be printed upon receiving a print command from the user after the print job bucket preview is being generated.

Figure 5:
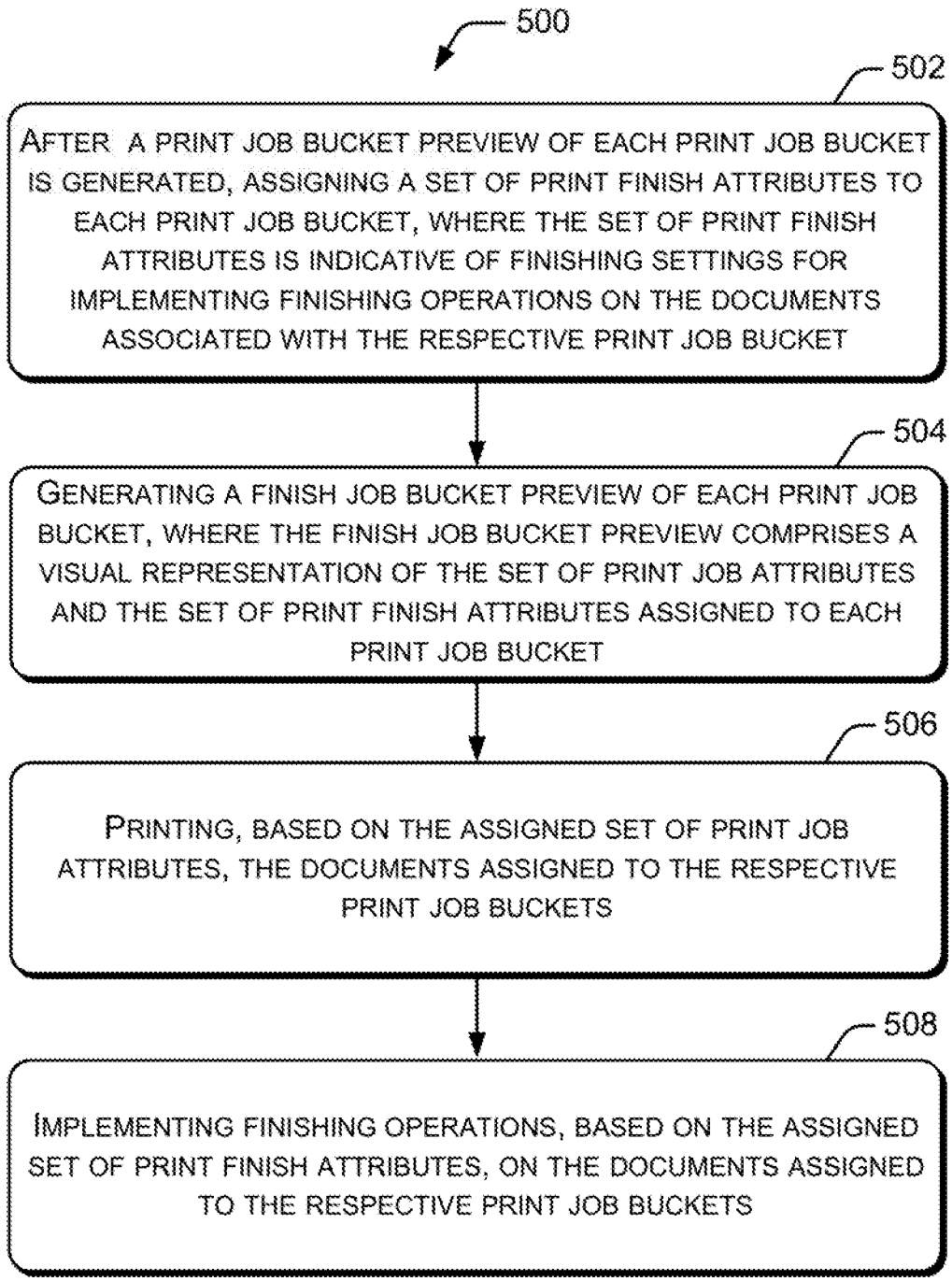
FIG. 5 illustrates a method of scanning, printing, and implementing finishing operations on documents assigned to respective print job buckets, according to an example implementation of the present subject matter.

In an example implementation, after the print job bucket preview of each print job bucket is generated at block 408, a set of print finish attributes may be assigned to each print job bucket for implementing finishing operations on the documents in a respective print job bucket. FIG. 5 illustrates a method 500 of scanning, printing, and implementing finishing operations on documents assigned to respective print job buckets, according to an example implementation of the present subject matter.

After the print job bucket preview of each print job bucket is generated, at block 502, a set of print finish attributes is assigned to each print job bucket. The set of print finish attributes is indicative of finishing settings for implementing finishing operations on the documents associated with a respective print job bucket. The print finish attributes may be indicative of performing stapling, folding, and hole-punching operations on documents associated with a respective print job bucket.

At block 504, a finish job bucket preview of each print job bucket is generated after the set of print finish attributes are assigned to each print job bucket. The finish job bucket preview comprises a visual representation of the set of print job attributes and the set of print finish attributes assigned to each print job bucket.

At block 506, the documents assigned to the respective print job buckets are printing based on the assigned set of print job attributes.

At block 508, finishing operations are implemented, based on the assigned set of print finish attributes, on the documents assigned to the respective print job buckets.

Figure 6:
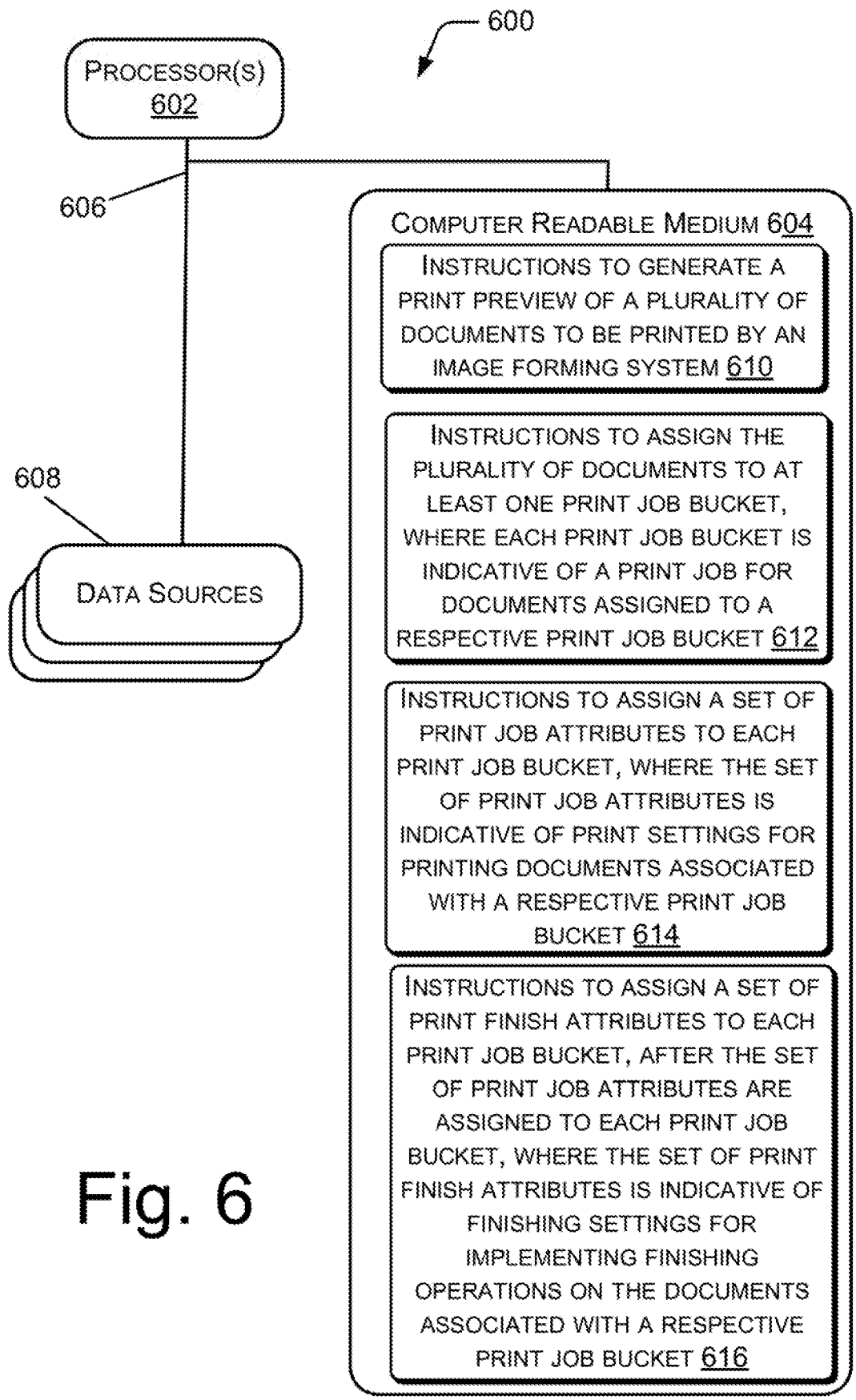
FIG. 6 illustrates a system environment implementing a non-transitory computer readable medium for processing documents to be printed, according to an example of the present subject matter.

FIG. 6 illustrates a system environment 600 implementing a non-transitory computer readable medium for processing documents to be printed, according to an example implementation of the present subject matter. In an example implementation, the system environment 600 includes processor(s) 602 communicatively coupled to a non-transitory computer readable medium 604 through a communication link 606. In an example implementation, the processor(s) 602 may be a processor of an image forming system. In an example, the processor(s) 602 may have one or more processing resources for fetching and executing computer-readable instructions from the non-transitory computer readable medium 604.

The non-transitory computer readable medium 604 can be, for example, an internal memory device or an external memory device. In an example implementation, the communication link 606 may be a direct communication link, such as any memory read/write interface.

The processor(s) 602 and the non-transitory computer readable medium 604 may also be communicatively coupled to data sources 608 over the network. The data sources 608 can include, for example, memory of the image forming system.

In an example implementation, the non-transitory computer readable medium 604 includes a set of computer readable instructions which can be accessed by the processor(s) 602 through the communication link 606 and subsequently executed to perform acts for processing of documents to be printed by an image forming system.

Referring to FIG. 6, in an example, the non-transitory computer readable medium 604 includes instructions 610 that cause the processor(s) 602 to generate a print preview of a plurality of documents to be printed by an image forming system.

The non-transitory computer readable medium 604 includes instructions 612 that cause the processor(s) 602 to assign the plurality of documents to at least one print job bucket, where each print job bucket is indicative of a print job for documents assigned to a respective print job bucket. The plurality of documents is assigned to at least one print job buckets based on gesture based touch inputs.

The non-transitory computer readable medium 604 includes instructions 614 that cause the processor(s) 602 to assign a set of print job attributes to each print job bucket. The set of print job attributes is indicative of print settings for printing of documents associated with a respective print job bucket.

The non-transitory computer readable medium 604 includes instructions 616 that cause the processor(s) 602 to assign a set of print finish attributes to each print job bucket, after the set of print job attributes are assigned to each print job bucket. The set of print finish attributes is indicative of finishing settings for implementing finishing operations on the documents associated with a respective print job bucket.

In an example implementation, the non-transitory computer readable medium 604 includes instructions that cause the processor(s) 602 to generate a finish job bucket preview of each print job bucket once the set of print finish attributes are being assigned to each print job bucket. The finish job bucket preview includes a visual representation of the set of print job attributes and the set of print finish attributes assigned to each print job bucket. Further, the non-transitory computer readable medium 604 may include instructions for performing methods described in FIGS. 3 to 5, or a combination thereof.

Although implementations of processing documents for printing, have been described in language specific to structural features and/or methods, it is to be understood that the present subject matter is not limited to the specific features or methods described. Rather, the specific features and methods are disclosed and explained as example implementations of processing documents for printing.

We claim:

1. A method of processing documents for printing, comprising:
   generating a print preview of a plurality of documents to be printed by an image forming system;
   assigning each of the plurality of documents to at least one print job bucket;
   assigning a set of print job attributes to each print job bucket, wherein the set of print job attributes is indicative of print settings for the image forming system; and
   generating a print job bucket preview of each print job bucket comprising a visual representation of the set of print job attributes assigned to that print job bucket presented on a preview of the documents assigned to that print job bucket, the preview of the documents indicating information contained in the documents assigned to that print job bucket.

2. The method as claimed in claim 1, comprising printing, based on the assigned set of print job attributes, the documents assigned to the respective print job buckets.

3. The method as claimed in claim 1, wherein assigning each of the plurality of documents to the at least one print job bucket comprises receiving a first set of user inputs indicative of assignment of the plurality of documents to the at least one print job bucket.

4. The method as claimed in claim 1, wherein assigning the set of print job attributes to each print job bucket comprises receiving a second set of user inputs indicative of assignment of the set of print job attributes to each print job bucket.

5. The method as claimed in claim 1, comprising:
   after generating the print job bucket preview of each print job bucket, further assigning a set of print finish attributes to each print job bucket, wherein the set of print finish attributes is indicative of finishing settings for implementing finishing operations on the documents associated with the respective print job bucket; and
   generating a finish job bucket preview of each print job bucket after assigning the set of print finish attributes to each print job bucket, wherein the finish job bucket preview comprises a visual representation of the set of print job attributes and the set of print finish attributes assigned to each print job bucket.

6. The method as claimed in claim 5, comprising:
   printing, based on the assigned set of print job attributes, the documents are assigned to the respective print job buckets; and
   implementing finishing operations, based on the assigned set of print finish attributes, on the documents assigned to the respective print job buckets.

7. An image forming system comprising:
   a display unit; and
   a print job manager for processing of documents to be printed by the image forming system, the print job manager to:
      generate, at the display unit, a print preview of a plurality of documents to be printed by the image forming system;
      assign, based on a first set of user inputs, each of the plurality of documents to at least one print job bucket; and
      assign, based on a second set of user inputs, a set of print job attributes to each print job bucket, wherein the set of print job attributes is indicative of print settings for the image forming system,
      wherein the print job manager is to generate a print job bucket preview of each print job bucket comprising a visual representation of the set of print job attributes assigned to that print job bucket presented on a preview of the documents assigned to that print job bucket, the preview of the documents indicating information contained in the documents assigned to that print job bucket.

8. The image forming system as claimed in claim 7, comprising a printing unit coupled to the print job manager to print, based on the assigned set of print job attributes, the documents assigned to respective print job buckets.

9. The image forming system as claimed in claim 7, wherein the first set of user inputs comprises gesture based touch inputs on the display unit, wherein the gesture based touch inputs are indicative of assignment of the plurality of documents to the at least one print job bucket.

10. The image forming system as claimed in claim 7, wherein the second set of user inputs comprises gesture based touch inputs on the display unit, wherein the gesture based touch inputs are indicative of assignment of the set of print job attributes to each print job bucket.

11. The image forming system as claimed in claim 7, wherein, the print job manager is to:
   assign a set of print finish attributes to each of print job bucket, after the print job bucket preview is being generated, wherein the set of print finish attributes is indicative of finishing settings for implementing finishing operations on the documents assigned to the respective print job buckets; and
   generate a finish job bucket preview of each print job bucket after the set of print finish attributes is assigned to each print job bucket, wherein the finish job bucket preview comprises a visual representation of the set of print job attributes and the set of print finish attributes assigned to each print job bucket.

12. A non-transitory computer-readable medium comprising computer-readable instructions, the computer-readable instructions for processing of documents to be printed by an image forming system, when executed by a processor, cause the processor to:
   generate a print preview of a plurality of documents to be printed by the image forming system;
   assign each of the plurality of documents to at least one print job bucket;
   assign a set of print job attributes to each print job bucket, wherein the set of print job attributes is indicative of print settings for the image forming system;
   assign a set of print finish attributes to each print job bucket after the set of print job attributes is assigned to each print job bucket, wherein the set of print finish attributes is indicative of finishing settings for the image forming system;

generate a finish job bucket preview of each print job bucket comprising a visual representation of the set of print job attributes and the set of print finish attributes assigned to that print job bucket; and generate a print job bucket preview of each print job bucket comprising a visual representation of the set of print job attributes assigned to that print job bucket presented on a preview of the documents assigned to that print job bucket, the preview of the documents indicating scanned information contained in the documents assigned to that print job bucket.

\* \* \* \* \*